Patented Aug. 6, 1935

2,010,402

UNITED STATES PATENT OFFICE 2,010,402

PREPARATION OF CARBOXYLIC ACIDS

Alfred T. Larson and Walter E. Vail, Wilmington, Del., assignors to E. I. du Pont de Nemours and Company, Wilmington, Del., a corporation of Delaware No Drawing. Application November 25, 1931, Serial No. 577,393

9 Claims. (Cl. 260—116)

This invention relates to a process for the formation of organic compounds and particularly to the preparation of monocarboxylic acids by the interaction of aliphatic alcohols and carbon monoxide in the presence of a catalyst.

It is known that organic acids and esters can be prepared by the interaction, in the vapor or liquid phase, of organic compounds with the oxides of carbon. For example, it has been shown that by the condensation of methyl alcohol with carbon monoxide in the presence of a suitable catalyst, acetic acid, methyl acetate, and methyl formate may be prepared in proportions which are governed by the particular operating conditions. Acids have likewise been prepared from methane and carbon monoxide, from carbon monoxide and water vapor, and from ethers and carbon monoxide. Investigators have experienced considerable difficulty in their attempts to find, for these reactions, a catalyst which under given operating conditions would produce, for an extended period, a good space-time-yield of the acid or other compounds desired. Some of the catalysts which have been suggested include the hydrogenating and hydrating catalysts alone or in combination, metal acetate catalysts which split off acetic acid under 450° C., and acid catalysts, such as phosphoric acid and its acid salts.

There are numerous disadvantages in the employment of the aforementioned catalysts, however. For instance, when the hydrogenating and hydrating catalysts are employed, particularly if acetic acid is the desired end product, but low yields of the acid result. With a metal acetate catalyst which decomposes to split off acetic acid, frequent reactivation is required which renders their use uneconomical from a commercial standpoint. When the liquid acid catalysts are used, difficulties in supporting them and maintaining their initial activity are encountered.

An object of this invention is to provide a process for the preparation of higher molecular weight organic compounds thru the introduction of carbon monoxide into the lower molecular weight organic compounds. A further object of this invention is to provide a process for the preparation of monocarboxylic acids by the condensation of an aliphatic alcohol with a carbon oxide in the presence of a catalyst. Another object of this invention is to provide a process for the preparation of acids having the structural formula: $C_nH_{2n+1}COOH$—from alcohols having the structural formula: $C_nH_{2n+1}OH$—by subjecting the alcohols to the action of the carbon monoxide in the presence of an ammonium halide and active carbon. Other objects will hereinafter appear.

The above objects can be realized by passing a vaporized aliphatic monohydroxy alcohol, carbon monoxide, and an ammonium halide, under suitable pressure and temperature conditions, over active carbon or more particularly over activated charcoal. The products resulting from such a reaction will contain generally a mixture of, among other compounds, aliphatic carboxylic acids some of which have a greater, some a lesser, number of carbon atoms than are present in the alcohol treated,—an aliphatic acid containing one more carbon atom than the alcohol, usually, predominating.

The ammonium halides which are suitable for use in our process include ammonium chloride, ammonium bromide, ammonium iodide or in fact any compound which acts similarly to the ammonium halide.

The ammonium halide may be added to the gaseous reactions in various ways. For example, the concentration desired is determined and such an amount of the halide is dissolved in the water to be used in the reaction, as water vapor, that upon injection a predetermined concentration is attained. Other means of adding the ammonium halide such, for instance, as adding anhydrous ammonia and a hydrogen halide directly to the gaseous stream, spraying an aqueous solution of an ammonium halide or other catalyst into the gaseous stream just prior to the reaction, or any other method may be employed many of which will readily suggest themselves to the expert in this art. The halide is preferably added to the gaseous stream prior to the reaction, but it may be added in portions during the progress thereof.

The alcohol-carbon monoxide reaction which can be accelerated by the above described catalysts may be expressed as follows:

$$C_nH_{2n+1}OH + CO \rightarrow C_nH_{2n+1}COOH.$$

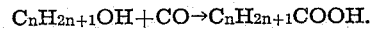

In accordance with the particular operating conditions, it will be found that, in some instances, the acid may not be formed directly in the free state, but may be produced as the ester of the alcohol. The alcohols used may be replaced, if desired, wholly or partly by the corresponding alkyl ethers of the alcohols, such as dimethyl ether, diethyl ether, or the mixed alkyl ethers, the alkyl esters, the alkyl amines, or the alkyl halides. Experts in this art know that it is advantageous, altho not essential, to have water vapor present during the methanol-carbon monoxide to acetic acid reaction. This is true also when the reaction is conducted with compounds which decompose to give the alcohol and is especially advantageous when the compound is such that it forms the alcohol by hydrolysis.

The synthesis can generally be efficiently carried out under the following operating conditions. The pressure may vary from approximately 25 atmospheres to 900 atmospheres or higher with the preferable operating range in the neighborhood of 350-700 atmospheres. These pressures do not differ materially from those used when other types of catalysts are employed for this synthesis nor do the temperatures vary appreciably from those already known for reactions of this type. For example, the process can be suitably carried out, with our catalyst, at temperatures of between 200-400° C., but still higher or lower temperatures may also be used in some cases, the speed of the reaction being increased, as would be expected, by the use of higher temperatures.

The carbon monoxide used may be obtained from various commercial sources, such, for example, as from water gas, producer gas, coke oven gas, etc., but to obtain products of the highest degree of purity it is preferable to remove from such commercial gases the objectionable constituents such as sulfur compounds, metal carbonyls, etc.

The presence of inert gases in the alcohol-carbon monoxide mixture is sometimes desirable. Nitrogen, for instance, has little deleterious effect on the reaction or yield and, in fact, may be advantageously used in order to aid in the temperature control and to prevent too great a conversion of the alcohols and carbon monoxide on one pass through the conversion apparatus. Other strictly inert gases usually act similarly. It is, of course, understood that instead of introducing methanol itself into the reaction chamber substances or mixtures of substances which decompose by hydrolyzing, for example, to form alcohols or which decompose to form esters or ethers may be employed, but generally we prefer to introduce methanol directly into the gas stream.

Our process can be conveniently carried out by passing purified carbon monoxide into aqueous methanol maintained at such a temperature that the issuing gases will have the requisite proportion of methanol, carbon monoxide, and a portion of the desired water vapor. The ammonium halide may be dissolved in water which may be injected into the system to give the desired amount of catalyst and total water vapor. Or alternatively the ammonium halide may be dissolved in aqueous menthanol and the resulting solution injected into the carbon monoxide stream prior to the reaction. We have found that a gaseous composition, containing an excess of carbon monoxide over the methanol vapor, will give a good yield of acetic acid and its ester on one pass thru a converter, the temperature of the reaction chamber being maintained at approximately 375° C. and the pressure held in the neighborhood of 700 atmospheres.

Not only can methanol be catalyzed in the presence of carbon monoxide and our catalyst to acetic acid, or methyl acetate, but the higher alcohols, such as ethyl alcohol, propyl alcohol, butyl alcohol, and even the higher molecular weight alcohols, such, for example, as hexyl alcohol or octyl alcohol, may be similarly converted into an acid having correspondingly one more carbon atom than the alcohol treated. In fact, our process and catalyst may be employed with any of the monohydric alcohols, providing these alcohols volatilize without decomposition under the conditions existing during the reaction. When converting the higher aliphatic alcohols, some of which are not water soluble, and particularly if water is desired in the reaction, it is preferable, generally, to introduce the alcohol and water into the carbon monoxide as a vapor or spray. Any other suitable procedure may be employed, however, for intimately commingling the vapors of the alcohol and water with the oxide of carbon. When preparing products from the higher molecular weight compounds we may utilize in lieu of the alcohols, the ethers, amides, halides, or esters thereof, the use of which will result in a good conversion with generally some slight modification in the ratio of acid to other products obtained.

We will now describe a specific embodiment of our process but it will be understood that the details therein given and the compounds employed, either as reactants or catalysts, in no way restrict the scope of this invention, but merely illustrate one manner in which our process may be carried out.

A gaseous mixture, containing 85% carbon monoxide, and 5% each of methanol, water vapor, and hydrogen, is passed together with approximately 1% ammonium chloride over activated charcoal which is disposed in a conversion chamber suitable for the carrying out of gaseous exothermic reactions. The reaction is conducted at a temperature of approximately 325° C. and a pressure of approximately 700 atmospheres. Upon condensation of the products of the reaction a good yield of acetic acid is obtained together with a small amount of other aliphatic acids.

The apparatus, which may be employed for conducting these reactions, may be of any conventional type and preferably one in which the temperature of the exothermic reaction can be readily controlled at the optimum value. Owing to the corrosive action of acetic acid, the interior of the converter and apparatus leading therefrom should preferably be protected. This may be accomplished by using glass or glass-lined apparatus or by plating the inner surfaces of the apparatus with chromium or silver, or using for the construction of this equipment acid-resisting alloy steels containing, for example, molybdenum, cobalt, tungsten, chromium, manganese, or nickel.

From a consideration of the above specification it will be realized that any process in which a carbon oxide is combined with an organic compound giving a product containing an aliphatic acid, and particularly those in which monohydric alcohols are converted to monocarboxylic acids will come within the scope of this invention when such reactions are accelerated in the presence of an ammonium halide and active carbon.

We claim:

1. A process for the preparation of oxygenated organic compounds which comprises contacting a compound, selected from the group consisting of a saturated aliphatic alcohol and a compound which gives a saturated aliphatic alcohol upon hydrolysis, and carbon monoxide in the presence of an ammonium halide, with active carbon.

2. A process for the preparation of oxygenated organic compounds which comprises contacting a compound, selected from the group consisting of a saturated aliphatic alcohol and a compound which gives a saturated aliphatic alcohol upon hydrolysis, and carbon monoxide in the presence of an ammonium halide, with activated charcoal.

3. A process for the preparation of oxygenated organic compounds which comprises contacting a saturated aliphatic alcohol which is not substantially decomposed when vaporized, carbon monoxide, and an ammonium halide with active carbon.

4. A process for the preparation of acetic acid which comprises contacting methanol, carbon monoxide and ammonium chloride with activated charcoal.

5. A process for the preparation of acetic acid which comprises contacting methanol, carbon monoxide and ammonium bromide with activated charcoal.

6. A process for the preparation of acetic acid which comprises contacting methanol, carbon monoxide and ammonium iodide with activated charcoal.

7. A process for the preparation of acetic acid which comprises passing methanol, carbon monoxide, and an ammonium halide at a temperature within the range of 200–400° C. and a pressure within the range of 350–700 atmospheres over charcoal.

8. A process for the preparation of acetic acid which comprises mixing an ammonium halide with methanol and subsequently passing the resulting mixture together with carbon monoxide over active carbon.

9. In a process for the preparation of oxygenated organic compounds from a compound selected from the group consisting of a monohydroxy alcohol and a compound which will decompose under reaction conditions to give such an alcohol, which is conducted at elevated temperatures and pressures the step which comprises conducting the reaction in the presence of an ammonium halide and active carbon.

ALFRED T. LARSON.
WALTER E. VAIL.

Certificate of Correction

Patent No. 2,010,402.

ALFRED T. LARSON ET AL.

August 6, 1935.

It is hereby certified that error appears in the printed specification of the above numbered patent requiring correction as follows: Page 1, first column, line 52, strike out the formula and insert instead $C_nH_{2n+1}COOH$; and that the said Letters Patent should be read with this correction therein that the same may conform to the record of the case in the Patent Office.

Signed and sealed this 17th day of September, A. D. 1935.

[SEAL]

LESLIE FRAZER,
*Acting Commissioner of Patents.*